United States Patent [19]

Muller

[11] Patent Number: 4,646,898

[45] Date of Patent: Mar. 3, 1987

[54] CLUTCH RELEASE MECHANISM

[75] Inventor: Patrick Muller, Sevran, France

[73] Assignee: Automotive Products plc, Leamington Spa, England

[21] Appl. No.: 850,039

[22] Filed: Apr. 10, 1986

[30] Foreign Application Priority Data

Apr. 10, 1985 [FR] France .................. 85 05385

[51] Int. Cl.$^4$ ............................................. F16D 23/14
[52] U.S. Cl. ...................................... 192/98; 192/89 B
[58] Field of Search .................... 192/89 B, 98, 110 B

[56] References Cited

U.S. PATENT DOCUMENTS

| | | | |
|---|---|---|---|
| 4,228,882 | 10/1980 | Huber et al. ........................... | 192/98 |
| 4,502,583 | 3/1985 | Limbacher ............................. | 192/98 |
| 4,560,053 | 12/1985 | Lassiuz ........................ | 192/89 B X |
| 4,588,061 | 5/1986 | Mallet ................................... | 192/98 |

FOREIGN PATENT DOCUMENTS

| | | |
|---|---|---|
| 2539473 | 7/1984 | France . |
| 2138095 | 6/1984 | United Kingdom . |
| 2131515 | 10/1984 | United Kingdom . |

*Primary Examiner*—Carl D. Friedman
*Attorney, Agent, or Firm*—Solon B. Kemon

[57] ABSTRACT

The mechanism includes a release member including a driving element in which is formed a circular groove. A washer which in use is coaxial with a diaphragm of the clutch is provided with clips which pass through a release ring. A flexible retaining ring is gripped resiliently between the release ring and the washer for location in the groove during coupling of the driving element to the clutch. The load derived from the resilient engagement of the retaining ring against the washer and release ring is insufficient to overcome a resilient grip between the clips and the release ring.

11 Claims, 17 Drawing Figures

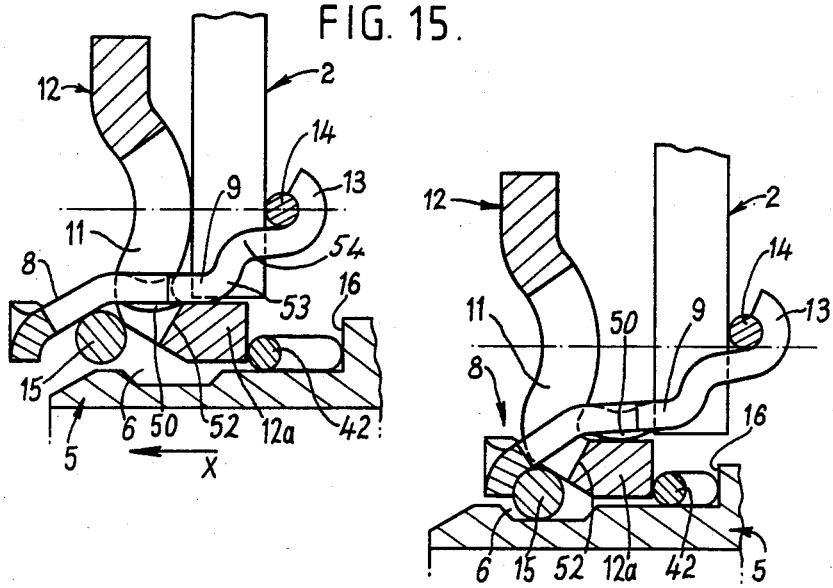
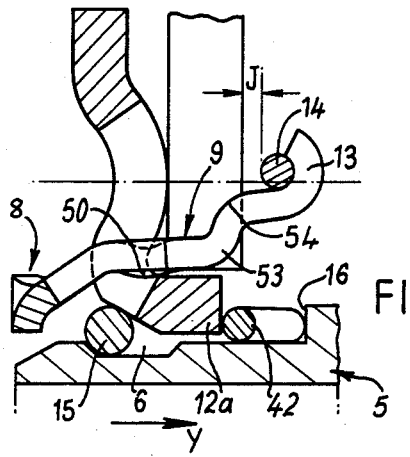

CLUTCH RELEASE MECHANISM

The invention relates to a clutch release mechanism for a pull-type friction clutch.

More precisely, the mechanism aimed at in the invention is of the type comprising a clutch release bearing associated with a driving element in which is formed a recess and means which enables clutch release forces to be transmitted to a diaphragm of the clutch. Such a mechanism is described in U.S. Pat. No. 4,228,882.

European Patent Application No. 0164871 describes a mechanism where the said means through which the forces are transmitted comprises a flexible ring formed by a retaining ring and a washer provided with flexible clips which grip round the retaining ring in order to join this solidly to the diaphragm, the retaining ring being adapted to ratch in the recess (typically a groove) of the driving element at the time of coupling-up and bearing on a supporting ring applied coaxially on a face of the diaphragm opposite to that on which the washer rests. The washer is provided with flexible mechanisms extending axially through the central opening of the diaphragm beyond the central clips and formed so as to exert on the retaining ring, after uncoupling of the driving element in relation to the diaphragm, a pressure keeping it applied against the flexible clips.

After uncoupling, the retaining ring is thus held in position and does not fall into the clutch housing. However, it is not necessary to dismantle the housing of the thrust to be able to replace the retaining ring in its initial position, thus allowing a fresh coupling-up operation to take place.

Moreover, the clips offer a certain amount of flexible resistance to the axial sliding of the driving element, a resistance which on the vehicle assembly line enables the operator to see that the coupling-up is at an end so that consequently it is necessary to terminate the penetration of the driving element in the clutch.

Nevertheless, a false manoeuvre drawing the driving element further than necessary may occur involving the premature unclipping of the retaining ring which then falls into the clutch housing, it then being necessary to dismantle the housing to be able to retrieve the retaining ring.

An object of the invention is then to provide an improved clutch release mechanism intended to reduce such drawbacks.

According to the invention there is provided a clutch release mechanism for a pull-type friction clutch comprising a clutch release element having a recess therein, a further element having clip means arranged to pass through a diaphragm of the friction clutch and resilient retaining means resiliently engageable with said further element, said resilient retaining means being arranged to locate in said recess when coupling the release element to the clutch, characterised in that said clip means is arranged to resiliently grip said release means with the diaphragm, in use, lying between the release means and a free end of said clip means, the resilient retaining means being resiliently engageable with said release means whereby load derived from the resilient engagement of the retaining means against the release means and further element is insufficient to overcome the resilient grip between the clip means and the release means.

In that way, the retaining means is held in a retaining position by the release means and further element when the clutch release element is moved in a clutch release direction for the first time after being coupled to the clutch.

Preferably, the recess has a wall portion which urges the retaining means outwardly against the release member and further element during uncoupling of the release mechanism from the clutch to create a load which will overcome the resilient grip between the clip means and release member.

The clip means may engage the periphery of a ring-like part of the release means. The free end of the clip means may locate stop means engageable with one side of the diaphragm. The free end of the clip means may comprise a curved nose. Preferably the stop means comprises a flexible retaining ring.

The free end of the clip means may be formed as a head arranged to lie adjacent one side of the diaphragm.

Preferably said further element is circular and said clip means may comprise a plurality of clips equally spaced circumferentially thereon.

One of said further element and release means may have an inclined surface which cooperates with the retaining means so as to locate the retaining means in said recess when the release element is coupled to the clutch.

Preferably both said further element and release member have inclined surfaces which co-operate with the retaining means when coupling the release element to the clutch.

In the coupled condition, clutch release forces may be transmitted from the release element to the diaphragm through the retaining means and the release means.

In the uncoupled condition, the retaining means may resiliently engage both the release means and the further element.

The clip means may include a projection which is arranged to resiliently engage a portion of said release means when the release element is coupled to the clutch and which in the uncoupled-condition occupies a position in which the resilient bias is relieved or reduced. Preferably, the projection comprises radial deformation of part of said further element, e.g. part of the clip means.

Biasing means may be located between the release element and the release means whereby in the coupled condition, the retaining member is biased axially towards a surface of said release element. The biasing may be a spring coaxial with the clutch release element and which may apply a resilient bias to said clutch release element and said release means in the coupled and uncoupled condition of the clutch release element.

In one embodiment, the clip means has an end portion formed by widened head which abuts against the diaphragm to retain the further element on the diaphragm.

Clutch release mechanisms according to the invention will now be described by way of example with reference to the accompanying drawings in which:

FIGS. 15 to 17 are partial axial cross-sectional views of an alternative clutch release mechanism in accordance with the invention illustrating stages of coupling.

Figure 1:
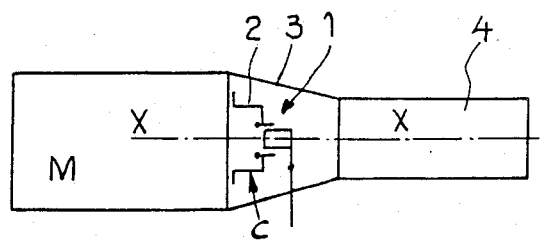
FIG. 1 is a diagram showing the positions of a gearbox, clutch release mechanism clutch and engine with the clutch release mechanism coupled to the clutch.

In FIG. 1 can be seen an engine M on which is mounted the diaphragm 2 of a pull-type friction clutch C. A clutch release member 1 of a clutch release mechanism is provided for the clutch and is accommodated in a housing 3 integral with a gearbox 4, the member 1 being coupled up with the clutch diaphragm 2.

Figure 2:
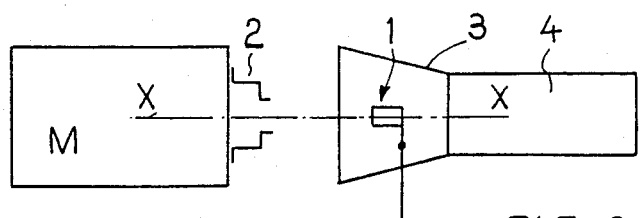
FIG. 2 is a diagram similar to FIG. 1 showing the relative positions of the various elements after the uncoupling of the clutch release mechanism and the gearbox.

FIG. 2 shows the relative positions of these elements after the uncoupling of the release member 1 in relation to the diaphragm 2.

Figures 6, 7:
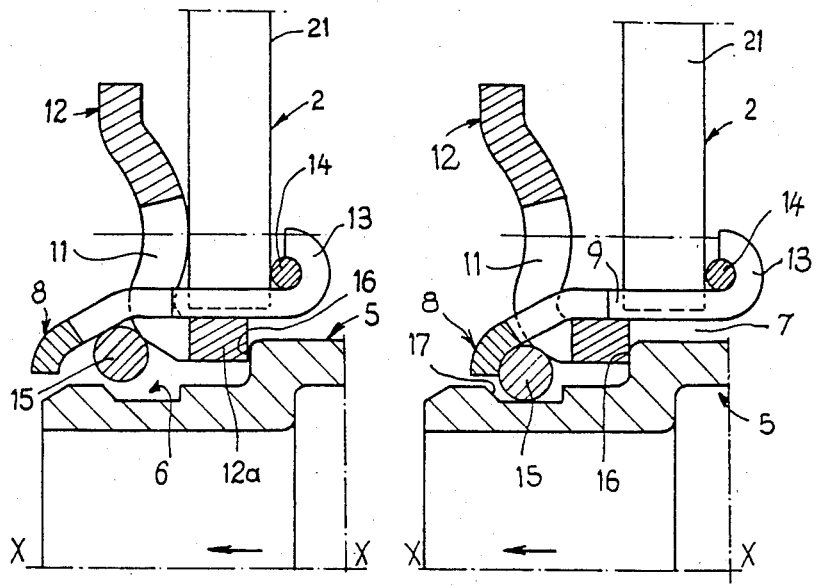
FIG. 6 is a partial axial cross-sectional view of the clutch release mechanism in accordance with the invention before coupling up with a driving element thereof.
FIG. 7 is a similar view to FIG. 6 showing the position of the elements of the mechanism at the commencement of coupling-up.

The clutch release member includes a ring-shaped driving element 5 and a clutch release bearing (not shown) associated with the element 5. The driving element 5 is coaxial with the axis XX of displacement of the release member 1 (FIGS. 1, 2 and 6). The element 5 has a lug formed with a circular groove 6. The element 5 is received by a central opening 7 of the diaphragm 2 and between radial fingers 21 of the latter when the mechanism 1 couples up with the clutch C.

The clutch release mechanism also includes a washer 8 (constituting the aforesaid further element) having e.g. five radial clips 9 or tabs (hereinafter called clips) regularly spaced out at equal angular intervals. The washer 8 is positioned coaxially with the diaphragm 2 with the clips 9 passing through associated ports 11 in a release ring 12. The clips 9 are provided with curved end noses 13 accommodating a retaining stop 14 for holding the washer 8 against the diaphragm 2. In this example, the retaining stop 14 consists of a flexible retaining ring which is engageable with the face of the diaphragm 2 opposite to that which faces towards the engine. Finally, the clips 9, in contrast to the nose 13, contain widened portions 10, the laterally protruding edges of which are supported on the fingers of the diaphragm 2.

The release ring 12 is arranged to engage the face of the diaphragm opposite to that adjacent the end noses 13, and the clutch release mechanism is completed by a ring-shaped flexible element 15 gripped between the ring 12 and the washer 8, the element 15 being adapted to locate in the groove 6 of the driving element 15 when the clutch release member is coupled with the clutch C.

The clips 9 resiliently engage the ring 12, and more especially a cylindrical or ring-shaped part 12a positioned in the opening 7 of the diaphragm 2. The resilient engagement produces a grip which is greater than the force resulting from the engagement of the flexible element 15 against the washer 8 and the ring 12.

The operation of the clutch release mechanism is now described as follows:

Before the release member 1 is coupled to the clutch (FIG. 6), the release ring 12 and the retaining stop 14 respectively engage the opposite faces of the diaphragm 2, the spaces between the fingers 21 being transversed by the clips 9, while the retaining ring 15 is held resiliently between the washer 8 and the ring 12.

When the driving element 5 of the clutch release member 1 is moved to the left towards the engine M following the axis X—X, an inside shoulder 16 thereof exerts a load on the inside part 12a of the ring 12 (FIG. 7) which moves aside the ring 12 of the diaphragm 2. This load is transmitted by the ring 12 to the retaining ring 15 which slides against the washer 8 and finally locates itself in the groove 6.

Figure 8:
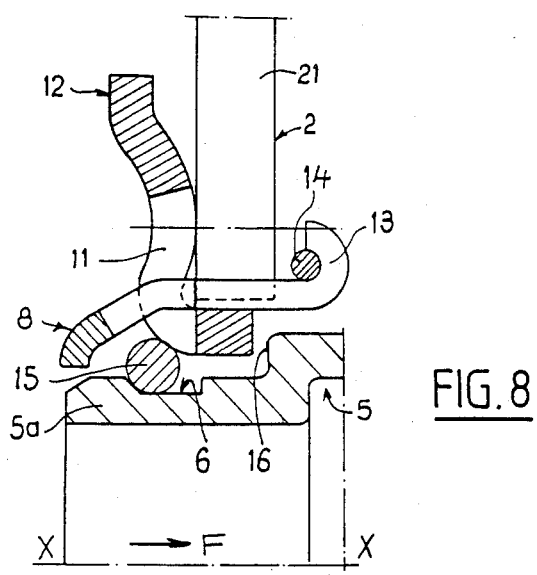
FIG. 8 is a view similar to FIGS. 6 and 7 showing the clutch release mechanism in a locked position after coupling up.

The driving element 5 is then withdrawn (arrow F, FIG. 8), so that the retaining ring 15 comes to rest on a truncated radius 17 of the groove 6 and exerts on the release ring 12 a load which causes the latter to abut against the diaphragm 2. The resilient radially outward load of the retaining ring 15 against the ring 12 and washer 8 is insufficient to create axial load components sufficient to overcome the resilient frictional grip of the clips 8 against the outer periphery of the ring shaped part 12a. Therefore, the resilient grip of the clips 9 and the ring 12 provides a firm frictional connection for this latter on the washer 8, which is then displaced at the same time as the ring 12, so that the retaining ring 14 and the end noses 13 are spaced by a clearance J from the diaphragm (FIG. 8). With the clutch release mechanism in this position, driving element 5 is locked with the diaphragm 2 by means of the retaining ring 15 which is supported on the one hand, on the truncated radius 17 and, on the other hand, on the release ring 12 which is itself supported on the diaphragm 2.

Figures 9, 10:
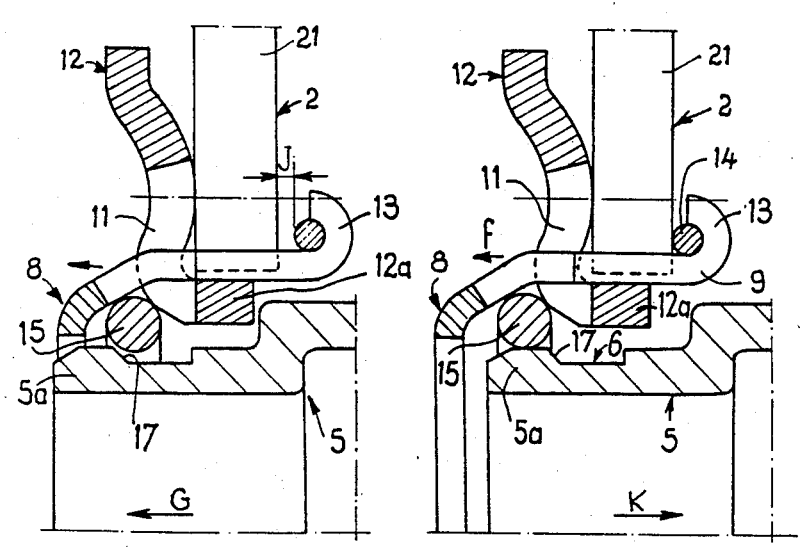
FIGS. 9, 10 and 11 are similar views to FIGS. 6, 7 and 8 showing the successive phases of an operation uncoupling the driving element.

In order to unlock the driving element 5 of the clutch release member 1 from the diaphragm 2 and the clutch C, the clutch release member 1 is moved in the direction of the arrow G (FIG. 9); that is to say, towards the engine M. The retaining ring 15 then ceases to be supported on the radius 17 and expands resiliently between the washer 8 and the ring 12, as can be seen in FIG. 9.

The clutch release member 1 is then drawn back in the direction of arrow K (FIG. 10) so that the edge of the radius 17 exerts on the retaining ring 15 a radial load which forces the said retaining ring completely from the groove 6. This load creates an axial component (FIG. 10) which, when transferred to the washer 8, causes it to slide in relation to the ring 12 in the direction of the engine M whilst the ring 12 stays pressed against the diaphragm 2. When the washer 8 stops moving, the clearance J existing between the stop 14 and the diaphragm 2 is eliminated, the stop 14 having again come to rest against the diaphragm 2 (FIG. 10).

Figure 11:
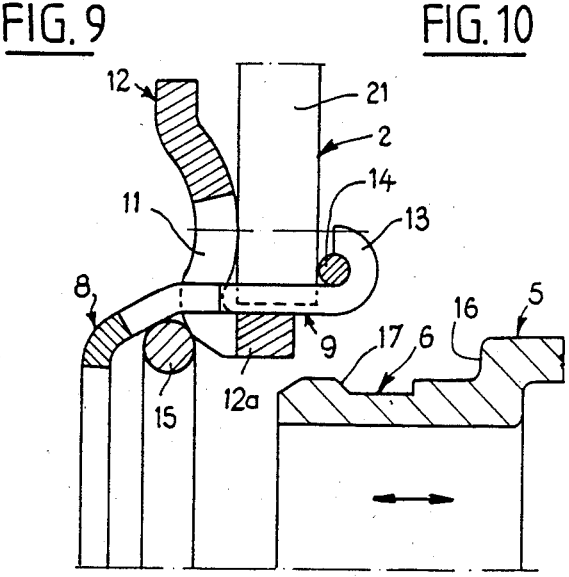

While the withdrawal of the driving element 5 is in progress (FIG. 11), the elements 15, 8, 12, 14 of the clutch release mechanism remain in the position in FIG. 11, that is to say, in the same position as they occupied in FIG. 6 prior to coupling-up.

The mechanism is thus ready for the driving element is to be re-locked to the diaphragm 2 without the need for any manipulation or dismantling of parts in order to replace the components of this mechanism in their initial position prior to coupling-up, this being an important advantage of the invention in relation to the earlier designs.

Figure 12:
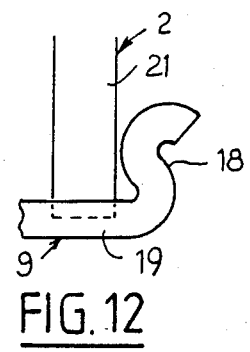
FIG. 12 is a partial elevational view of a design variant of clips on the washer.
Figure 13:
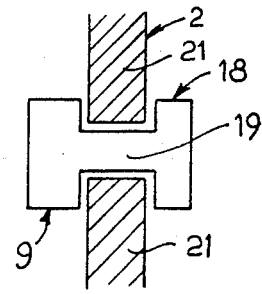
FIG. 13 is a view from above of the clip in FIG. 12.
Figure 14:
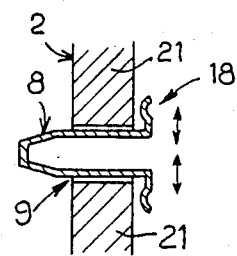
FIG. 14 is a schematic side elevational view of a washer in accordance with the variant of FIGS. 12 and 13, introduced into a diaphragm of the clutch.
Figures 3, 4:
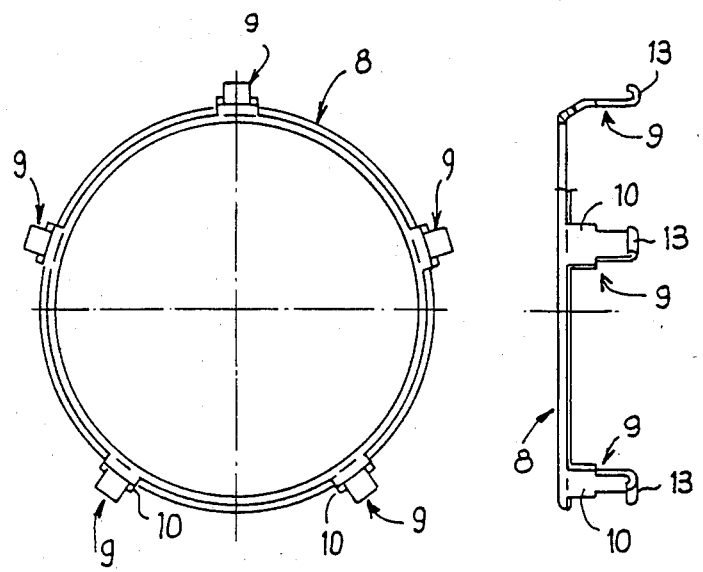
FIGS. 3 and 4 are plan and side elevational views respectively of a form of construction of a washer of the clutch release mechanism in accordance with the invention.
Figure 5:
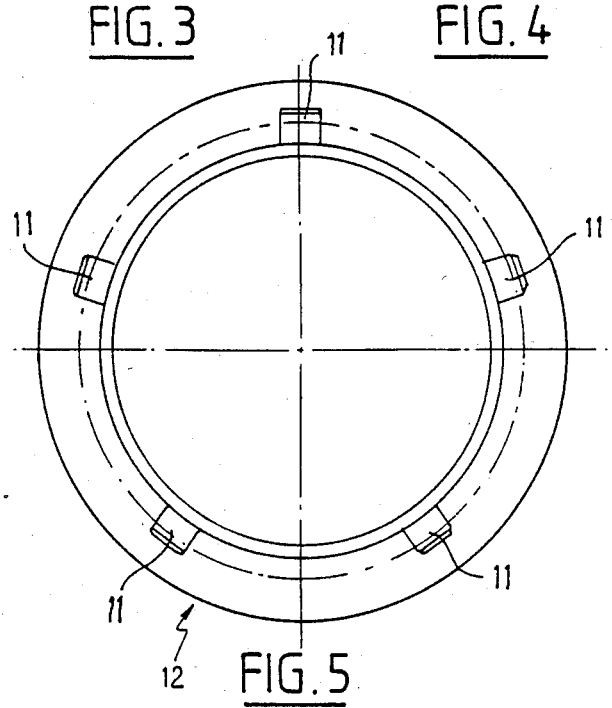
FIG. 5 is a plan view of a release ring for connection to the washer of FIGS. 3 and 4.

FIGS. 12 to 14 illustrate a design variant of the mechanism in accordance with the invention, in which the clips 9 of the washer 8 comprise end portions 18 formed by widened heads connected by narrowed portions 19 to the remaining clips 9. The measurements of the narrowed portions 19 are such as to facilitate positioning leaving a slight clearance between the radial fingers 21 of the diaphragm 2 and enabling the clips 9 to be placed in this latter by resiliently drawing their heads 18 together to allow them to pass into the opening 7 of the diaphragm 2 (arrows in FIG. 14), followed by a resilient expansion in the course of which the narrowed portions 19 take up position between the fingers 21. The widened heads 18 form stops holding the washer 8 against the fingers 21 in place of the retaining ring 14 of the previous version, consequently keeping the washer 9 solidly connected to the diaphragm 2.

The number of the clips 9 and of the associated ports 11 is immaterial, a minimum of three being preferred.

In FIGS. 15 to 17 parts corresponding to parts in FIGS. 1 to 14 carry the same reference numerals. FIGS. 15 to 17 are equivalent to FIGS. 6 to 8.

A corrugated spring 42 or other suitable resilient member is positioned between the shoulder 16 and release ring 12. In FIG. 15, the spring is in a relaxed condition. Each of the clips 9 of washer 8 includes a radially inwardly deformed portion 50 which in the FIG. 15 position lies in an associate port 11 immediately to the left of the ring shaped part 12a. The latter part is formed with an inclined surface 52 facing the deformed portion 50. The clips 9 are bent upwardly at 53 and outwardly at 54 and terminate at free ends in the forms of end noses. 13. A retaining stop 14 is provided as before.

To couple the driving element 5 to the clutch, the element 5 is moved in the direction of arrow X thereby shifting the release ring 12 axially towards the engine and urging the retaining ring 15 into the groove as in FIG. 16. The force required to compress the ring 15 also results in compression of the spring 42. Movement of the release ring 12 towards the engine causes the deformed portions 50 to ride up the associate surfaces 52 and on to the outer periphery of ring part 12a as in FIG. 16. Such movement resiliently deforms the clips 9 outwardly thereby creating a firm frictional grip between the clips 9 and the ring portion 12a. A very strong grip can be achieved in that way yet it is not necessary to overcome substantial frictional grip between the clips 9 and the ring part 12a when assembling the components 8, 12 into the FIG. 15 condition as the non deformed part of each clip can if desired, be a sliding fit on part 12a. This embodiment is, therefore, particularly easy to assemble.

After reaching the FIG. 16 condition, the driving element 5 can be released whereby the spring 42 will effect movement of the driving element 5 in direction Y relative to the release ring 12 until the FIG. 17 is reached.

The washer 8 is thereby moved to the right together with the release member 12 as before so as to create a clearance J.

The spring 42 in FIG. 17 provides a continuous bias so as to inhibit accidental leftward movement of the driving member 15 relative to the release ring 12. In that way the chances of accidental release are considerably reduced. In the FIG. 17 conditon clutch release forces can be applied to the element 5 in direction F. Release of the driving member 5 is effected in the same manner as described with respect to FIGS. 9 to 11 above.

I claim:

1. A clutch release mechanism for a pull-type friction clutch comprising a clutch release element having a recess therein, a further element having clip means arranged to pass through a diaphragm of the friction clutch, release means gripped resiliently by said clip means whereby in use the diaphragm lies between the release means and a free end of the clip means and resilient retaining means engageable with the further element and the release element and arranged to locate in said recess when coupling the release element to the clutch, the load derived from the resilient engagement of the retaining means against the release means and further element being insufficient to overcome the resilient grip between the clip means and the release means.

2. A clutch release mechanism according to claim 1 in which the recess has a wall portion which urges the retaining means outwardly against the release element and further element during uncoupling of the release mechanism from the clutch to create a load which will overcome the resilient grip between the clip means and release means.

3. A clutch release mechanism according to claim 1 in which the clip means engages the periphery of a ring-like part of the release means.

4. A clutch release mechanism according to claim 1 in which at least one of said further element and release means has an inclined surface which cooperates with the retaining means so as to locate the retaining means in said recess when the release element is coupled to the clutch.

5. A clutch release mechanism according to claim 4 in which both said further element and release means have inclined surfaces which co-operates with the retaining means when coupling the release element to the clutch.

6. A clutch release mechanism according to claim 1 in which in the coupled condition, clutch release forces are transmitted from the release element to the diaphragm through the retaining means and the release means.

7. A clutch release mechanism according to claim 1 in which in the uncoupled condition the retaining means resiliently engages the release means and the further element.

8. A clutch release mechanism according to claim 1 in which the further element includes a projection which is arranged to resiliently engage a portion of said release means when the release element is coupled to the clutch and which in the uncoupled condition occupies a position in which the resilient engagement is relieved or reduced.

9. A clutch release mechanism according to claim 8 in which the projection comprises a radial deformation on said further element.

10. A clutch release mechanism according to claim 1 in which biasing means is located between the release element and the release means whereby in the coupled condition, the retaining member is biased axially towards a surface of said release element.

11. A clutch release mechanism according to claim 1 in which the clip means has an end portion formed by widened heads which abut against the diaphragm to retain the further element on the diaphragm.

* * * * *